Sept. 26, 1961   H. C. EMERICK   3,001,240
PROCESS FOR PRODUCING DENTAL RESTORATIONS
Filed March 21, 1957
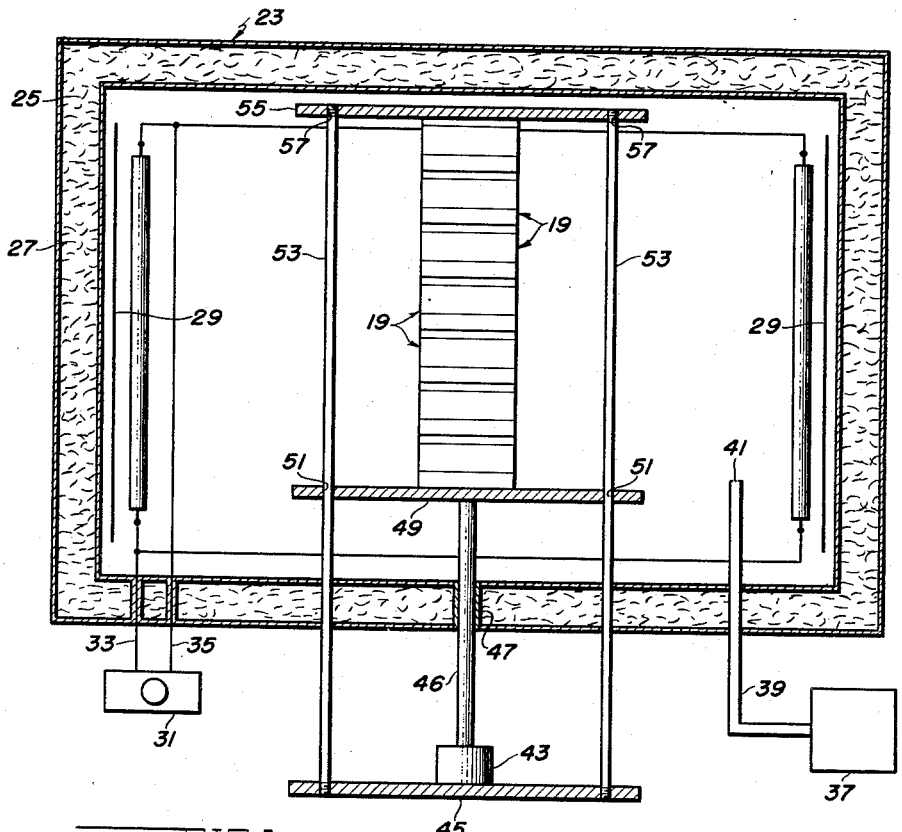
FIG.1
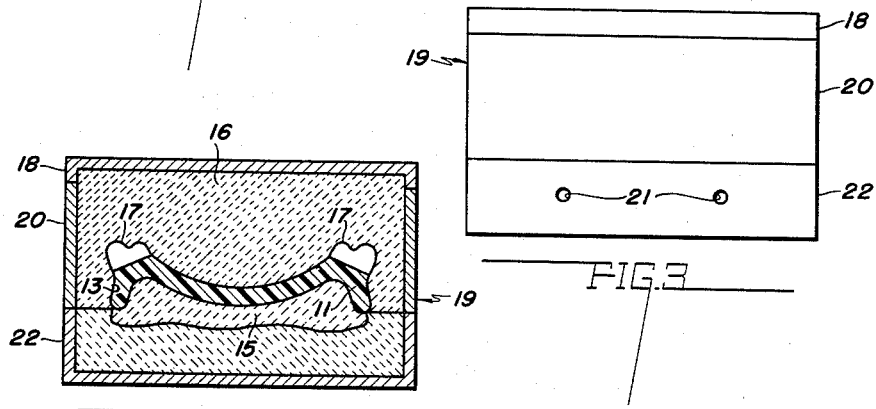
FIG.2
FIG.3
INVENTOR.
HAROLD C. EMERICK
BY Albert L. Jeffers
ATTORNEY United States Patent Office 3,001,240
Patented Sept. 26, 1961

3,001,240
PROCESS FOR PRODUCING DENTAL
RESTORATIONS
Harold C. Emerick, 5007 Wayne Trace, Fort Wayne, Ind.
Filed Mar. 21, 1957, Ser. No. 647,692
13 Claims. (Cl. 18—55.1)

This invention relates to the process for obtaining aesthetically and functionally improved plastic dental appliances.

Since the advent of plastic dental appliances and particularly acrylic dental appliances, there has been considerable effort to improve the dimensional stability of the appliance, since this has remained one of the persistent problems in what is otherwise a very desirable prosthetic medium.

The dimensional instability of the acrylic resin is believed to arise from internal stresses within the resin which develop during processing and remain in the finished appliance. The dimensional instability is manifested by warpage and general distortion causing misfit of the appliance and disorientation of the denture. Another undesirable effect of warpage is that the appliance becomes more susceptible to fracturing under the influence of externally imposed loads arising during use.

It is one of the objects of the present invention to obtain a process for making acrylic resin base dental prosthetics which will produce a dimensionally stable prosthetic not subject to the warpage and other structural deviations normally associated with previously produced dental prosthetics. This is accomplished by heat processing the resin prosthetic at higher temperatures than those previously used to obtain a substantially complete removal of moisture, unpolymerized resin fractions and other volatile components. Since there is a functionally improved resin prosthetic when it is heat processed at high temperatures, it is thought that those elements which have been removed may have contributed in some measure to the instability of the previously used prosthetics made in accordance with the prior art methods.

It was previously held by those skilled in the acrylic prosthetic art that the acrylic dental resins should be processed at low temperatures (about 160° F.) in order to achieve dimensional stability. (See "Acrylic and Other Dental Resins," by Tylman and Peyton, published by J. A. Lippencott Compaany.) For example, on pages 74 and 124 of the test "Acrylic and Other Dental Resins" there is reported that in processing acrylic resins the lower temperatures are more favorable. I have found that just the contrary relationship exists.

Another factor which is believed pertinent to the improved structural stability is that complete polymerization of the acrylic resin is produced and that no further chemical change occurs within the resin during usage which could alter its properties.

Also contributing to the structural strength of the prosthetic is a closely bonded network of nylon fibre which is fused within the acrylic resin to provide reinforcement for the resin.

It has been further discovered that such undesirable effects upon the resin as whitening, mottling and porosity, as well as other pyrolytic effects, can be avoided by heating the resin, in a closed chamber having substantially all the air exhausted therefrom.

It was previously thought that the heat treatment for the resin should not exceed curing temperatures of 212° F. Usually boiling water baths were prescribed to achieve the necessary heat treatment. Various authorities advised against temperatures in excess of 212° F. because of untoward effects upon the resin, such as discoloration, porosity, etc., in the finished structure. See "Acrylics and Other Dental Resins" (supra), pp. 83, 119.

Another advantage discovered in the finished prosthetic made in accordance with the invention is that it is generally improved in its strength properties, viz., the denture is harder and thus resists indentations, it has less flexure fatigue, increased proportional limit, possesses improved impact resistance and adheres more efficiently to embedded plastic or porcelain teeth.

Instead of encountering undue porosity at the higher processing temperatures (240° F. to 280° F.) which led those skilled in the art away from the invention (see "The Veronite Work Bench," Pittsburgh, Vernon-Benshoff Co.) it has been discovered that such objections can be overcome and actually lead instead to unexpected improvements.

A further feature of the invention is that when a gypsum or plaster of Paris material is used as the investment mold, the investment material in undergoing the novel process becomes friable to permit removal of the prosthetic without damage from impaction. It was previously quite common to damage the prosthetic in the process of removing the finished resin structure from the surrounding investment. I propose to eliminate the source of damage.

A still further feature of this invention is the provision of an electric vacuum oven or vacuum heating chamber wherein the temperatures can be raised substantially above 212° F. and the provision of means for controlling the degree of temperature therein.

Another feature of the invention is to provide hydraulic means for holding a number of flasks closed within the oven and means for applying pressure to the flasks during the novel process.

An important feature of the invention is the provision of a flask having a number of apertures in the lower portion so that a vacuum may be obtained within the flask.

Other objects and features of the invention will become apparent from a consideration of the following description which proceeds with reference to the accompanying drawings, wherein FIGURE 1 is a sectional view taken through a heating chamber containing a number of charged flasks having an investment and resin content constructed in accordance with the invention;

FIGURE 2 is a sectional view taken through a flask ready for processing;

FIGURE 3 is a front elevational view of a flask illustrating the apertures therein.

The ingredients used in forming the resin are polymerized powder methyl methacrylate which is mixed with liquid monomer available commercially as a trademark product sold under the designation "Lucitone," "Densene" and "Verno-Nite," etc.

A paste or gel of even consistency is formed of the powder and liquid, and red colored nylon fiber is next added to the gel to impart a blood vessel appearance to the finished product.

The resultant mixture 11 is then transferred to a mold cavity 13 in the model 15 and investment 16 which may consist of gypsum, dental stone, plaster of Paris or the like.

The mold cavity conforms in outline to the shape of the prosthetic desired. That is, the mold is made in accordance with palate impression which governs the shape of the resin during molding.

The general requirement of the gel or dough 11 is that while being of stiff consistency it will yet permit adaptation in the mold.

After the resin charge is adapted within the mold cavity, a plurality of teeth 17 are arranged about the periphery of the charge and are embedded therein.

The split flask 19 having sections 18, 20 and 22 is then closed. It should be noted that the flask is provided with apertures 21.

The electric vacuum oven or vacuum heated chamber 23 comprises an enclosure having a space 25 fitted with insulation 27 and is provided with a gold plated reflector plate 29 which surrounds the sides of the chamber. A number of heat lights or lamps, preferably six lamps of 500 watts each, are disposed along the sides of the chamber and are controlled by a power stat 31 connected to the bulbs by lines 33 and 35.

The vacuum pump 37 is connected to the inside of the chamber through line 39 having a screen 41 disposed on the inlet.

Pressure means preferably in the form of a hydraulic jack 43 mounted on a base plate 45 disposed outside of the chamber and having an actuating member 46 extending through a bronze bushing 47 which provides a vacuum seal and extends into the chamber. A movable plate 49 is mounted on the actuating member and is provided with openings 51 for slidably receiving mounting rods 53. A stationary plate 55 is secured to the rods as shown at 57.

The charged flask or a number of flasks are next placed within the enclosed heating chamber 23, and heat is gradually applied for a period of about one hour until the temperature of the flask and contents reaches about 160° F. to 200° F. During this stage of the process partial resin polymerization occurs and air bubbles are removed from the resin charge.

A slight pressure is developed on the flask by manual operature of the jack during this period of softening the resin in order to safeguard against porosity. It is during this period that the resin attains its maximum plasticity.

At the end of the described heating period the enclosure 23 is exhausted to establish a vacuum of approximately 28 inches of mercury by the pump 37. The temperature of the oven is now increased to heat the flask and contents to approximately 550° F. The resin is heated at this temperature for a period of about ½ hour to 1½ hours depending upon the size of the oven, the number of flasks, etc. The important consideration is that the resin is thoroughly heat-permeated at this temperature and allowed to bake until complete polymerization is effected and all volatile fractions are removed. During this stage the flasks are under pressure and are bearing against the contents to ensure confinement of the resin charge.

The apertures 21 disposed in the lower portion of the flasks permit a vacuum to be created within the flasks so that the resin is pulled downwardly whereby the resin will have a tendency to retain a more processed form of the mold or model, forming a more perfect fit in its oral location. Also, the apertures expedite the removal of the gases, air and moisture within the flask.

This heat treatment precludes stratification within the resin. The resin is homogeneous and this is thought to be attributed in some degree to the high curing temperature. It will be appreciated that this temperature is well beyond any of the recommended curing temperatures previously followed. All avialable literature from other investigators contraindicates the usage of such temperatures during heat-processing to cure the resin.

With complete removal of the air and gases from the plastic and moisture from the investment, there is a firmer securement between the resin and teeth which are embedded in the resin. The tenacity of the bond between tooth and binder-resin is a much improved combination in this regard.

During the second stage of heating the resin charge, there has been noted a marked change in the resin at about 380° F. or higher. It is theorized that a fusion of the acrylic-base resin and nylon thread takes place at this stage whereby the two materials are cohered. This seems likely since the properties of the finished product in the matter of strength are considerably improved to indicate a more intimate combination of the two materials than previously obtained at the lower temperature processing.

Since the internal stresses are removed from the finished product by means of the described process, there is greater structural stability and hence less warpage. The higher processing temperatures also lead to improved reproduction quality of the prosthetic. The absence of internal strains very probably promotes improved conformance of the resin with the outline of the mold cavity, thus making possible a greater adaptation of the resin to the mold outline. There has been clearly established a marked improvement in molding fidelity by usage of the processing procedure described. A fair evaluation of the processing technique is possible since the same resins and same molds have been used to make a first prosthetic and second prosthetic. In preparing the two prosthetics the only departure was in the manner of manufacture described. There was in the two finished products a much more favorable reproduction where the processing followed the steps described herein than obtained with the conventional molding methods.

Owing to the non-warpage nature of the prosthetic, the palate-shaped prosthetic retains the original shape and thus contributes to comfort and firm positioning in its oral location.

The product has also an observable temperature stability. When the product is first tested, there is no evolution of odor, and there is no tendency toward discoloration.

When it is desired to form a clear palate in a denture, the plastic contains chemicals to harden the plastic. In the conventional process the chemicals have a tendency to turn the plastic a milky color. Due to the fact that these chemicals are volatile, they will be removed by the vacuum in this novel process whereby the milky color is eliminated and the plastic results in a very clear palate.

The process is adaptable for various composition variations. For example, the monomer may be eliminated and a dough made of the powdered methyl methacrylate and nylon or neoprene.

It is not intended by specific reference to the 550° F. temperature that this temperature is the only attainable temperature. Other temperatures are established according to the resin composition. The temperature being established by the general rule that sufficient heat is developed to attain complete polymerization, removal of all volatile fractions from the resin, and homogeneity of the resin charge.

It is important to retain a sufficient vacuum in the chamber during the second stage heating to avoid pyrolytic deterioration of the resin. If the vacuum diminishes, then there is the likelihood of scorching, discoloration and deterioration of the resin. These aesthetic considerations are highly important in dental technology. The simulation of the prosthetic to oral tissue is quite good where the material has been processed as described. Not only is discoloration, mottling, etc., avoided in processing, but also these properties have been found to be stabilized in the finished product with the end result being an improved appliance for the prosthetic user.

During this second stage heating all uncombined water is removed from the investment (gypsum or plaster of Paris) as well as substantially all the air and gases from the resin. This permits the flask and flask contents to be heated above the conventional 212° F. curing temperature.

In the conventional hot water bath process for making the prosthetic appliances, this temperature of 212° F. was not exceeded and it is quite likely that unpolymerized monomeric fractions remain in the resin. It is quite possible that the removal of these monomers bears some relation to the substantiated improvement.

The high temperatures may have the further effect of relaxing internal stresses normally established incidentally to the formation of polymerized acrylic base resin products.

After about one hour, the temperature of 550° F. is gradually reduced, but the vacuum in the oven is maintained to safeguard pyrolysis of the resin. The cooling rate is reduced sufficiently to allow for thermal contractions so as to avoid damage to the flask and contents.

When the charge is cooled, the denture is easily removed by crumbling the investment away which has become quite friable during the heat processing. This is done without impacting the investment which was necessarily incident to removal of the finished product under prior methods. Previously, this removal of the appliance was oftentimes accompanied by damage to the finished appliance.

Tylman and Peyton in their text "Acrylics and Other Dental Resins" (supra) cite (page 139) as one of the processing difficulties the technical problems surrounding removal of the processed denture from flask without damage to the teeth or resin structure. Reference in this regard is made to Tuckfields, W. J., et al.: "Acrylic Resin in Dentistry," Austral. Jour. Dent., 47, 1–26, 1943. It is further suggested by Tylman and Peyton (supra) that in the process of deflasking the processed denture can receive distortions accounting for dimensional instability leading to the previously mentioned warpage.

The acrylic dentures constructed in accordance with this novel process can be repaired by standard processes now in use.

Numerous modifications and revisions of the invention will readily suggest themselves to those skilled in the art. It is not intended by reference to the selected example embodiments to restrict the invention thereto. It is intended to include within the scope of the following claims such further adaptation of the invention that embody the disclosed principles.

I claim:

1. A process for making a heat-hardenable resin dental prosthetic from a mixture of polymeric and monomeric resin material comprising the steps of: forming a gypsum type plaster mold investment having a model which conforms with the desired appliance shape, filling said plaster investment with said resin which is in pliable form to adapt to said model and is surrounded by the pervious mold investment structure which retains said resin in its desired appliance shape and provides egress of moisture, monomer and other volatile ingredients from said resin through the surrounding walls of said mold, disposing the resin filled mold having the model and resin content therein within a flask which yieldably confines said resin within its mold cavity to adapt said resin to the desired appliance shape, preliminarily heating said plaster model mold and its resin content to initiate removal of the vaporizable gaseous content thereof and concurrently effect partial resin polymerization, continuously exhausting the atmosphere surrounding said charged flask to safeguard both the plaster mold investment and its resin content against heat induced deterioration, and thereafter heating said plaster mold and its resin content substantially above 212° F. to remove substantially all volatilizable material from said resin and which is removable through said pervious plaster and thereby to effect substantially complete resin polymerization.

2. The process of claim 1 in which said preliminary heating is at a temperature range and time period below that necessary for effecting complete polymerization of said resin to obtain removal of air bubles and initiate partial resin polymerization.

3. The process of claim 2 in which the flask contents consist of gypsum mold material and acrylic resin and are heated at a temperature range of between about 160° F. to about 200° F. for a period of about one hour.

4. The process of claim 1 in which the flask and flask contents are subjected to a constant pumping action to effect an ambient vacuum by continuously withdrawing materials emerging from said plaster mold investment and resin and through apertures of said flask to maintain a vacuum in the order of 28 inches of mercury.

5. The process of claim 4 in which the flask is heated for a second stage under subatmospheric conditions for a period of ½ to 1½ hours depending upon the number of flasks concurrently processed to effect substantially complete polymerization of said resin.

6. A process for producing resin dental appliances in which the resin constitutes a palate formation, said process comprising the steps of: filling an investment mold with a resin charge which is pliable to conform to the outline and shape of said mold and includes a combination of polymeric and monomeric polymerizable materials, confining said resin charge within its investment mold cavity by means of a surrounding investment wall structure, said investment wall structure being pervious to allow passage therethrough of the gaseous materials liberated from said resin during heating thereof and thereby allowing escape of said gases which are volatilized within said resin, subjecting said investment to a constant vacuum action which withdraws both moisture and other volatilizable material within said resin and its surrounding gypsum investment to safeguard said gypsum investment and resin against deterioration from heat, partially polymerizing the resin content within said investment mold by heating to a temperature below 212° F., and thereafter increasing the heating of said resin and its surrounding investment at a temperature substantially above 212° F. and less than about 550° F. to completely polymerize the resin and remove substantially all the uncombined volatilizable materials therein and without deteriorating said resin.

7. The process of claim 6 in which the resin comprises a cake sufficiently pliable to be conformable with the mold cavity and inclusive of powdered methyl methacrylate and liquid monomer.

8. The process of claim 6 in which there is added artificial teeth within said palate and threadlike colored nylon to the acrylo composition to simulate blood vessel formation in the dental appliance.

9. The process of claim 8 in which the resin is characterized by substantially complete polymerization and is free from non-reacted monomers, the filaments of nylon being distributed as a network throughout the acrylo resin and heat treated to be fused therewith.

10. A process for making heat-hardenable dental structures having synthetic oral tissue consisting of resin and the like, said process comprising the steps of: forming a plaster model which defines a cavity for receiving the resin and conforms said resin to its predetermined shape adapting it to an individual mouth, said resin being in a pliable condition and including a combination of polymeric and liquid monomer material, filling said mold with the polymerizible resin which is sufficiently pliable to conform wih said cavity, confining said resin within said cavity under a positive pressure and surrounding said mold cavity with a porous vapor-phase conductive investment comprising gypsum and the like, thereafter subjecting resin charge and its surrounding investment to a continuous vacuum action and simultaneously heating said resin and investment by applying heat to the exterior of said investment and which elevates said resin to a temperature substantially in excess of its polymerization temperature and thereby effecting substantially complete removal of all volatile fractions in the resin charge by passage thereof through said investment, said vacuum being effective to suppress destructive pyrolytic effects of both said resin and investment incident to heating at said elevated temperature.

11. A process for making dental restoratives comprising the steps of: inserting polymerizable mixture of polymeric and monomeric resin plastic material within a dental stone investment mold of the gypsum type having moisture therein, disposing said mold and its contents within an enclosed chamber, effecting subatmospheric pressure within said chamber to remove constantly gaseous impurities within said plastic material conducive to impairment thereof, and polymerizing at elevated temperatures and above the volatilization temperature of the monomeric fraction of said plastic material at said subatmospheric pressure within said chamber, said gypsum mold being also subjected to subatmospheric pressure to suppress calcination as an incident to said polymerization at elevated temperature.

12. The process in accordance with claim 11 wherein said polymerization is produced and wherein said mold and contents are under exterior compression.

13. The process in accordance with claim 11 in which said plastic material comprises heat-hardenable acrylic resin.

References Cited in the file of this patent
UNITED STATES PATENTS

| | | |
|---|---|---|
| 1,926,344 | Meyer | Sept. 12, 1933 |
| 2,120,006 | Strain | June 7, 1938 |
| 2,136,404 | Wheeler | Nov. 15, 1938 |
| 2,210,483 | Feron | Aug. 6, 1940 |
| 2,391,106 | Saffir | Dec. 18, 1945 |
| 2,528,219 | Feagin | Oct. 31, 1950 |
| 2,551,812 | Nelson | May 8, 1951 |
| 2,590,258 | Marki | Mar. 25, 1952 |
| 2,640,265 | Vaillancourt | June 2, 1953 |
| 2,654,949 | Whiteley et al. | Oct. 13, 1953 |
| 2,659,106 | Leicht | Nov. 17, 1953 |
| 2,705,836 | Watson | Apr. 12, 1955 |
| 2,750,318 | La Grande Oglisby et al. | June 12, 1956 |
| 2,793,436 | Gotlib | May 28, 1957 |